(12) United States Patent
Park

(10) Patent No.: US 7,761,117 B2
(45) Date of Patent: Jul. 20, 2010

(54) APPARATUS AND METHOD FOR INDICATING THE KIND OF CURRENT COMMUNICATION SERVICE OF DUAL MODE MOBILE TERMINAL

(75) Inventor: Jae-Sun Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 824 days.

(21) Appl. No.: 10/925,636

(22) Filed: Aug. 25, 2004

(65) Prior Publication Data

US 2005/0152304 A1 Jul. 14, 2005

(30) Foreign Application Priority Data

Jan. 14, 2004 (KR) .................. 10-2004-0002664

(51) Int. Cl.
*H04B 1/38* (2006.01)
(52) U.S. Cl. .................. 455/566; 455/552.1; 455/421; 455/435.2; 455/442; 455/67.11; 455/449; 455/437; 455/553.1; 370/342; 370/331; 370/328
(58) Field of Classification Search .............. 455/552.1, 455/553.1, 566, 421, 435.1–435.3, 67.11, 455/550.1, 575.1, 442; 370/331–333
See application file for complete search history.

(56) References Cited

U.S. PATENT DOCUMENTS

| | | | | |
|---|---|---|---|---|
| 4,989,230 A * | 1/1991 | Gillig et al. | ............... | 455/552.1 |
| 5,613,213 A * | 3/1997 | Naddell et al. | ............ | 455/435.2 |
| 5,663,957 A * | 9/1997 | Dent | ........................ | 370/347 |
| 5,778,322 A * | 7/1998 | Rydbeck | .................... | 455/558 |
| 5,839,075 A * | 11/1998 | Haartsen et al. | ............. | 455/450 |
| 5,877,695 A * | 3/1999 | Kubes et al. | ............. | 340/815.4 |
| 6,038,444 A * | 3/2000 | Schipper et al. | ............. | 455/421 |
| 6,112,088 A * | 8/2000 | Haartsen | .................... | 455/437 |
| 6,198,941 B1 * | 3/2001 | Aho et al. | ................ | 455/552.1 |
| 6,393,307 B1 * | 5/2002 | Kim | .......................... | 455/566 |
| 6,546,263 B1 * | 4/2003 | Petty et al. | .................. | 455/566 |
| 6,625,451 B1 * | 9/2003 | La Medica et al. | .......... | 455/434 |
| 6,704,581 B1 * | 3/2004 | Park et al. | ................ | 455/553.1 |
| 6,751,472 B1 * | 6/2004 | Muhonen | ................. | 455/553.1 |
| 6,778,829 B1 * | 8/2004 | McDonald et al. | ....... | 455/435.1 |
| 6,859,653 B1 * | 2/2005 | Ayoub et al. | ............. | 455/435.2 |
| 6,909,892 B2 * | 6/2005 | Tuji et al. | ................... | 455/421 |
| 7,031,280 B2 * | 4/2006 | Segal | ......................... | 370/331 |
| 7,054,627 B1 * | 5/2006 | Hillman | .................. | 455/422.1 |
| 7,076,274 B2 * | 7/2006 | Jollota et al. | ................ | 455/561 |
| 7,149,549 B1 * | 12/2006 | Ortiz et al. | ................... | 455/566 |
| 7,181,237 B2 * | 2/2007 | Stockhusen | ............. | 455/552.1 |
| 7,224,999 B1 * | 5/2007 | Yamaguchi | ................. | 455/566 |
| 7,356,357 B2 * | 4/2008 | DeCost et al. | ............. | 455/566 |

(Continued)

FOREIGN PATENT DOCUMENTS

CN 1246027 3/2000

(Continued)

*Primary Examiner*—Sharad Rampuria
(74) *Attorney, Agent, or Firm*—The Farrell Law Firm, LLP

(57) ABSTRACT

A dual-mode mobile terminal capable of accessing two or more different mobile communication systems in which the terminal includes a controller for determining if the terminal is currently located in service areas of the mobile communication systems, and displaying an indicator of at least on of mobile communication systems, which currently provides a communication service to the terminal.

11 Claims, 4 Drawing Sheets

U.S. PATENT DOCUMENTS

| | | |
|---|---|---|
| 7,496,360 B2 * | 2/2009 | Sindhwani et al. ....... 455/422.1 |
| 7,539,492 B2 * | 5/2009 | Jagadeesan et al. ......... 455/436 |
| 7,548,751 B2 * | 6/2009 | Katori et al. ................. 455/443 |
| 2001/0044298 A1 * | 11/2001 | Tuji et al. ................... 455/421 |
| 2003/0134637 A1 * | 7/2003 | Cooper ....................... 455/432 |
| 2004/0032393 A1 * | 2/2004 | Brandenberg et al. ....... 345/156 |
| 2004/0192290 A1 * | 9/2004 | Muthuswamy et al. ...... 455/425 |
| 2004/0214573 A1 * | 10/2004 | Bamburak et al. ....... 455/435.2 |
| 2005/0130661 A1 * | 6/2005 | Aerrabotu et al. ........... 455/437 |
| 2005/0153736 A1 * | 7/2005 | Ganton ................... 455/553.1 |
| 2005/0237978 A1 * | 10/2005 | Segal ......................... 370/331 |
| 2005/0245250 A1 * | 11/2005 | Ebenshpanger ............. 455/421 |
| 2006/0183477 A1 * | 8/2006 | Bocking et al. .......... 455/435.2 |
| 2008/0009324 A1 * | 1/2008 | Patel .......................... 455/566 |
| 2008/0096559 A1 * | 4/2008 | Phillips et al. ........... 455/435.2 |

FOREIGN PATENT DOCUMENTS

| | | |
|---|---|---|
| JP | 7-111680 | 4/1995 |
| KR | 10-0298109 | 5/2001 |

\* cited by examiner

US 7,761,117 B2

APPARATUS AND METHOD FOR INDICATING THE KIND OF CURRENT COMMUNICATION SERVICE OF DUAL MODE MOBILE TERMINAL

PRIORITY

This application claims priority to an application entitled "DUAL-MODE MOBILE TERMINAL AND METHOD FOR NOTIFYING USER WHETHER MOBILE COMMUNICATION SYSTEM PROVIDES COMMUNICATION SERVICE", filed in the Korean Intellectual Property Office on Jan. 14, 2004 and assigned Ser. No. 2004-0002664, the contents of which are incorporated herein by reference.

BACKGROUND OF THE INVENTION

1. Field of the Invention

The present invention relates generally to a mobile terminal, and more particularly to a dual-mode mobile terminal that supports both synchronous and asynchronous modes.

2. Description of the Related Art

The use of mobile terminals has rapidly increased around the world. Mobile communication systems, which provide communication services to the mobile terminals, can be divided into a global system for mobile communications (GSM) mobile communication system primarily used in Europe and a code division multiple access (CDMA) mobile communication system primarily used in North America. The CDMA mobile communication system utilizes a synchronous data transmission mode and the GSM mobile communication system utilizes an asynchronous data transmission mode. The synchronous mode synchronizes a transmitter and a receiver using an American GPS satellite, whereas the asynchronous mode synchronizes using a special chip or software.

In some areas, both the synchronous CDMA mobile communication system and the asynchronous GSM mobile communication system provide mobile communication services. In such areas where the CDMA and GSM mobile communication systems are used together, users must have CDMA terminals if they wish to receive CDMA services or GSM terminals if they wish to receive GSM services. Recently, however, a dual-mode mobile terminal, which has the ability to access both the synchronous CDMA and asynchronous GSM mobile communication systems to receive communication services therefrom, is under development to meet this need.

When the dual-mode mobile terminal is connected to the synchronous or asynchronous mobile communication system, the terminal notifies the user as to which mobile communication system the terminal is currently connected to. However, no method or technology for meeting the need has been suggested.

SUMMARY OF THE INVENTION

Therefore, the present invention has been designed in view of the above and other problems, and it is an object of the present invention to provide a dual-mode terminal and a method for notifying a user of a terminal as to which mobile communication system the terminal is currently connected to.

In accordance with the present invention, the above and other objects can be accomplished by a dual-mode mobile terminal capable of accessing at least two different mobile communication systems. The terminal includes a controller for recognizing that the terminal is currently located in service areas of the at least two mobile communication systems, and displaying an indicator of at least one of the at least two mobile communication systems, which currently provides a communication service to the terminal.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may obscure the subject matter of the present invention.

Figure 1:
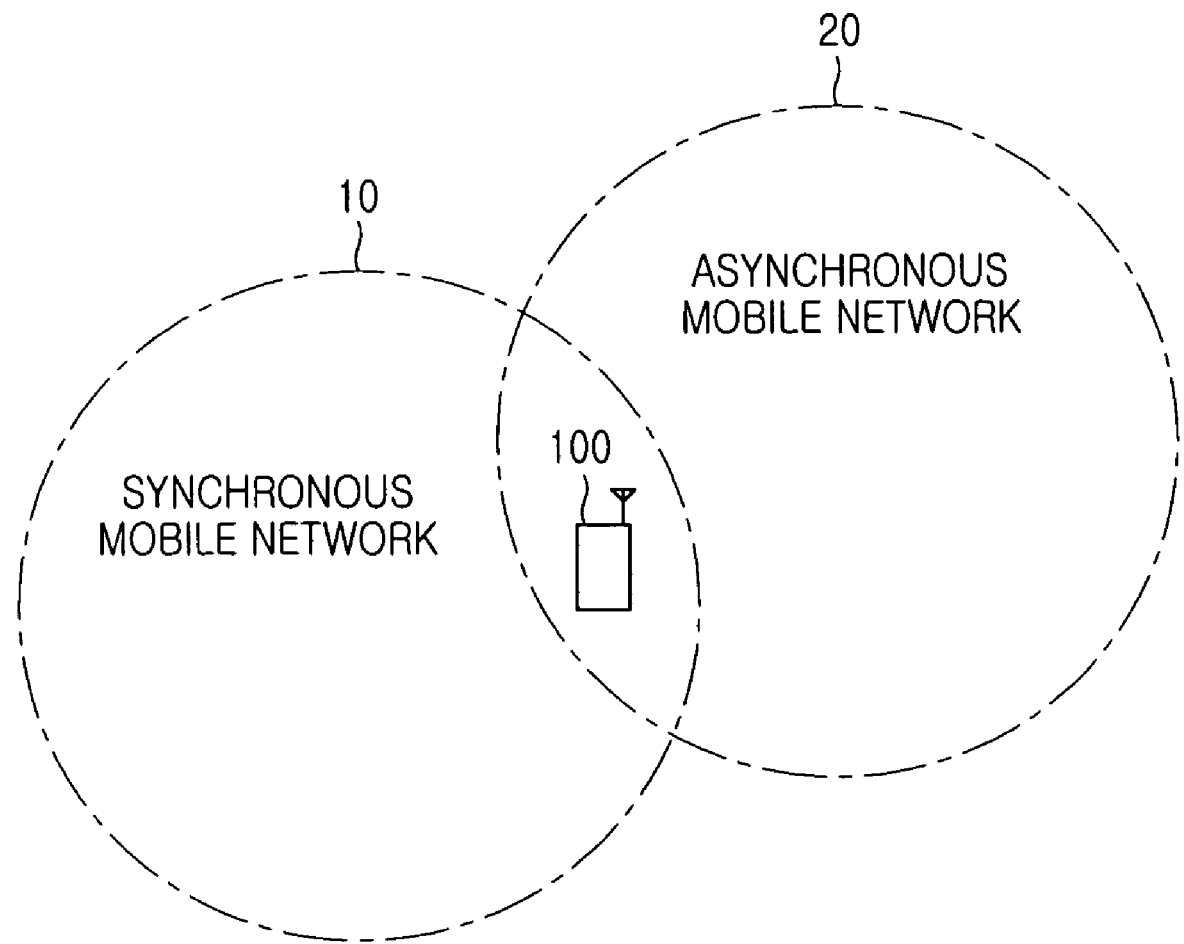
FIG. 1 is a diagram illustrating service areas of mobile communication systems, which are accessible by a dual-mode mobile terminal according to the present invention.

FIG. 1 is a diagram illustrating service areas of mobile communication systems that are accessible by a dual-mode mobile terminal according to the present invention. As illustrated in FIG. 1, a dual-mode mobile terminal 100 is positioned in a service area covered by both a synchronous mobile communication system 10 and an asynchronous mobile communication system 20. In the present invention, it is assumed that the dual-mode terminal 100 can simultaneously gain access to synchronous and asynchronous communication systems and receive communication services therefrom. More specifically, the dual-mode terminal 100 can receive calls from the synchronous and asynchronous communication systems 10 and 20. The dual-mode terminal 100 can also receive SMS messages and various other information from the synchronous and asynchronous mobile communication systems 10 and 20 at the same time. Additionally, the user of the dual-mode terminal 100 can select a desired one of the synchronous and asynchronous communication systems 10 and 20 and transmit a call to the selected system.

According to the present invention, the dual-mode terminal 100 notifies the user as to which mobile communication system the terminal 100 is currently connected to. If the dual-mode terminal 100 currently receives communication services from both the synchronous and asynchronous mobile communication systems 10 and 20, the terminal 100 displays an indicator of the synchronous mobile communication system 10 and an indicator of the asynchronous mobile communication system 20 on a display unit according to an embodiment of the present invention. If the dual-mode terminal 100 is currently connected to one of the synchronous and asynchronous mobile communication systems 10 and 20, the dual-mode terminal 100 displays only an indicator of the one mobile communication system from which the terminal 100 can currently receive a communication service.

Alternatively, the dual mode terminal 100 may display both an indicator of one mobile communication system, from which the terminal 100 can currently receive a communication service, and an indicator of another mobile communication system, from which the terminal 100 cannot currently receive a communication service, in different manners. For example, the dual-mode terminal 100 displays an indicator of one of the synchronous and asynchronous mobile communication systems, from which the terminal 100 can currently receive a communication service, in the form of a solid line, and displays an indicator of the other system, from which the terminal 100 cannot currently receive a communication service, in the form of a dotted line or in conjunction with another indicator of the unavailable communication service. By viewing such mobile communication system indicators displayed on the display unit of the dual-mode terminal 100, the user is aware of the available communication services.

According to the present invention, in addition to the indicator of a mobile communication system currently providing a communication service to the dual-mode terminal 100, the terminal 100 may display a received signal strength indicator that indicates the strength of a signal received from the mobile communication system.

Figure 2:
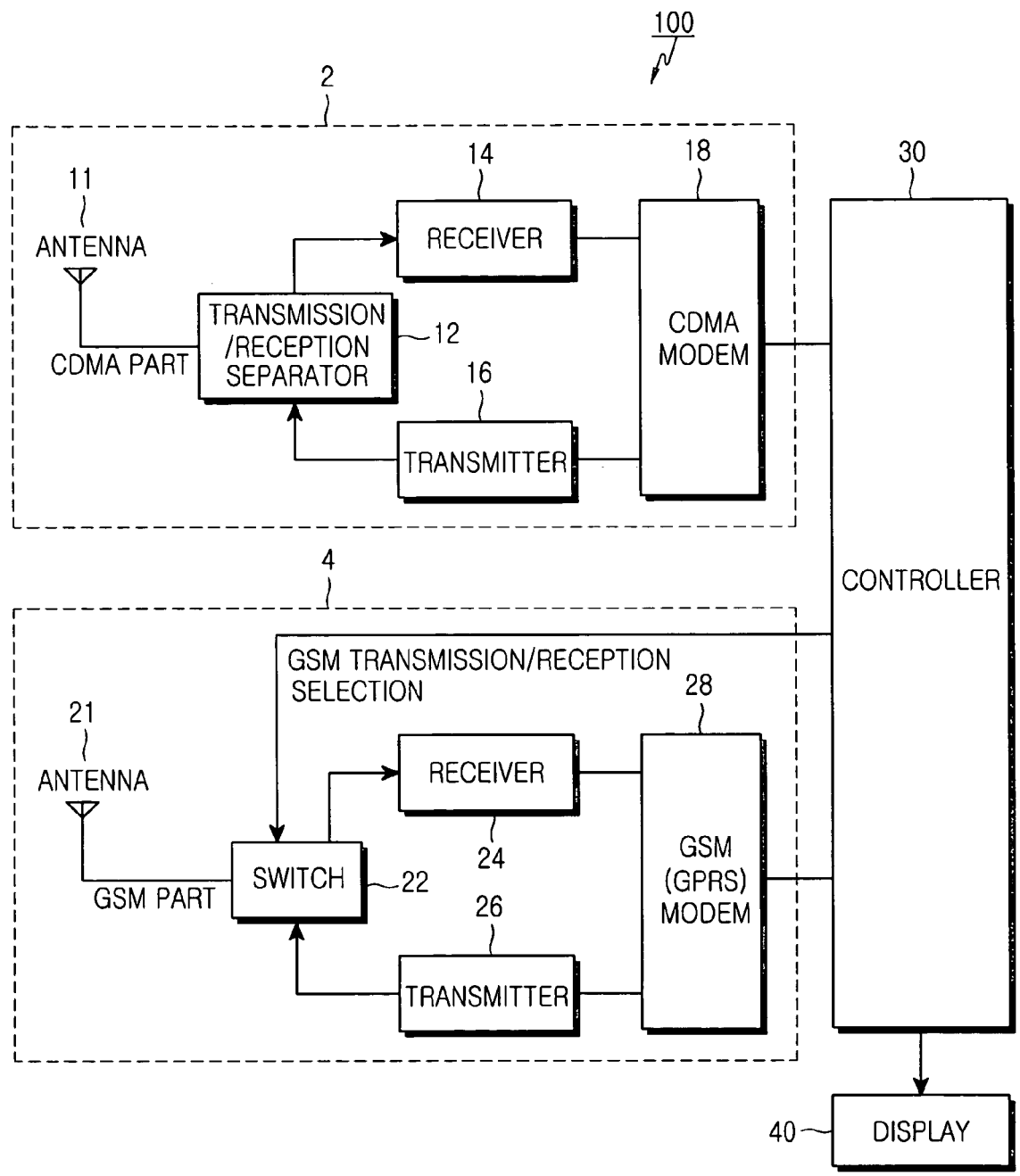
FIG. 2 is a block diagram illustrating a dual-mode mobile terminal according to an embodiment of the present invention.

FIG. 2 is a block diagram illustrating the configuration of a dual-mode mobile terminal 100 according to an embodiment of the present invention. As illustrated in FIG. 2, the dual-mode terminal 100 includes a synchronous CDMA module 2, an asynchronous GSM module 4, a controller 30, and a display unit 40. The controller 30 controls the overall operation of the synchronous CDMA module 2 and the asynchronous GSM module 4. The synchronous CDMA module 2 includes a CDMA antenna 11, a transmission/reception separator 12, a receiver 14, a transmitter 16, and a CDMA modem 18.

The CDMA antenna 11 is used to transmit and receive radio signals to and from the synchronous CDMA mobile communication network 10, and is designed to be sensitive to frequencies used in the CDMA mobile communication network. If a radio signal is received from the CDMA mobile communication network 10 through the CDMA antenna 11, the received signal is input to the transmission/reception separator 12 in the CDMA module 2.

The transmission/reception separator 12 in the CDMA module 2 outputs the received signal from the CDMA antenna 11 to the receiver 14. When the transmission/reception separator 12 receives a transmission signal from the CDMA modem 18 via the transmitter 16, the separator 12 outputs the transmission signal to the CDMA antenna 11. The transmitter 16 modulates data output from the CDMA modem 18, and transmits an RF signal carrying the modulated data through the transmission/reception separator 12 and the CDMA antenna 11. The receiver 14 receives a radio signal through the CDMA antenna 11 via the transmission/reception separator 12, and converts the received signal into an intermediate frequency (IF) signal and demodulates it into data, and then outputs it to the CDMA modem 18. The CDMA modem 18 modulates an audio signal received through a microphone (not shown) into a radio signal, and demodulates a radio signal received through the receiver 14 into an audio signal and outputs it through a speaker (not shown).

The asynchronous GSM module 4 includes a GSM antenna 21, a switch 22, a receiver 24, a transmitter 26, and a GSM modem 28. The GSM antenna 21 is used to transmit and receive radio signals to and from the asynchronous GSM mobile 15 communication network 20, and is designed to be sensitive to frequencies used in the GSM mobile communication network. If a radio signal is received from the GSM mobile communication network 20 through the GSM antenna 21, the received signal is input to the switch 22 in the GSM module 4.

The switch 22 in the GSM module 4 outputs the received signal from the GSM 20 antenna 21 to the receiver 24. When the switch 22 receives a transmission signal from the GSM modem 28 via the transmitter 26, the switch 22 outputs the transmission signal to the GSM antenna 21. The GSM system uses a Time Division Duplex (TDD) scheme, such that channels assigned to uplink and downlink are spaced apart from each other by specified time intervals. In the GSM system, a terminal and a base station perform transmission and reception in intervals of time slots therebetween, such that transmission and reception are not performed in the terminal at the same time. That is, the GSM terminal deactivates its receiver during transmission and deactivates its transmitter during reception. The switch 22 connects an output of the transmitter 26 to the GSM antenna 21 during transmission under the control of the controller 30. However, the switch 22 connects the GSM antenna 21 to an input of the receiver 26 during reception under the control of the controller 30.

The transmitter 26 modulates data output from the GSM modem 28 and transmits an RF signal carrying the modulated data through the switch 22 and the GSM antenna 21. The receiver 24 receives a radio signal through the GSM antenna 21 via the switch 22, converts the received signal into an intermediate frequency (IF) signal, demodulates it into data, and then outputs it to the GSM modem 28. The GSM modem 28 modulates an audio signal received through the microphone (not shown) into a radio signal, and demodulates a radio signal received through the receiver 24 into an audio signal, which is output through the speaker (not shown). The CDMA antenna 11 and the GSM antenna 21 may also be embodied as a single antenna.

The display unit 40 generally includes a Liquid Crystal Display (LCD) or the like to display various messages, icons, etc., under the control of the controller 30. The display unit 40 displays mobile communication system indicators and a received signal strength indicator that indicates the strength of a signal received from a mobile communication system, which currently provides a communication service to the dual-mode terminal 100, under the control of the controller 30.

As described above, the controller 30 is connected to the synchronous CDMA module 2 and the asynchronous GSM module 4 to control the overall operation of the two modules 2 and 4. For example, the controller 30 enables the synchronous CDMA module 2 and the asynchronous GSM module 4 to transmit and receive radio signals. Accordingly, the controller 30 can determine whether a communication service is currently provided through the synchronous CDMA module 2 and the asynchronous GSM module 4. The controller 30 enables an indicator of a mobile communication system, which currently provides a communication service, to be displayed on the display unit 40.

More specifically, the controller 30 displays two respective indicators, e.g., synchronous and asynchronous mobile communication systems, providing communication services on the display unit 40. According to an embodiment of the present invention, the indicator of the synchronous CDMA mobile communication system is displayed in the form of a letter "C", and the indicator of the asynchronous GSM mobile communication system is displayed in the form of a letter "G". If the dual-mode terminal 100 can access one of the synchronous and asynchronous mobile communication systems, the controller 30 may display only an indicator of the one mobile communication system that can currently provide a communication service.

Alternatively, the dual mode terminal 100 may display both an indicator of one mobile communication system, from which the terminal 100 can currently receive a communication service, and an indicator of another mobile communication system, from which the terminal 100 cannot currently receive a communication service, in different manners. For example, the dual-mode terminal 100 displays an indicator of one of the synchronous and asynchronous mobile communication systems, from which the terminal 100 can currently receive a communication service, in the form of a solid line, and displays an indicator of the other system, from which the terminal 100 cannot currently receive a communication service, in the form of a dotted line or in conjunction with another indicator of the unavailable communication service.

According to the present invention, in addition to the indicator of a mobile communication system that currently provides a communication service to the dual-mode terminal 100, the controller 30 may display a received signal strength indicator that indicates the strength of a signal received from the mobile communication system.

By viewing such mobile communication system indicators displayed on the display unit 40, as described above, the user can know from which mobile communication system or systems the user is receiving a communication service.

Figure 3:
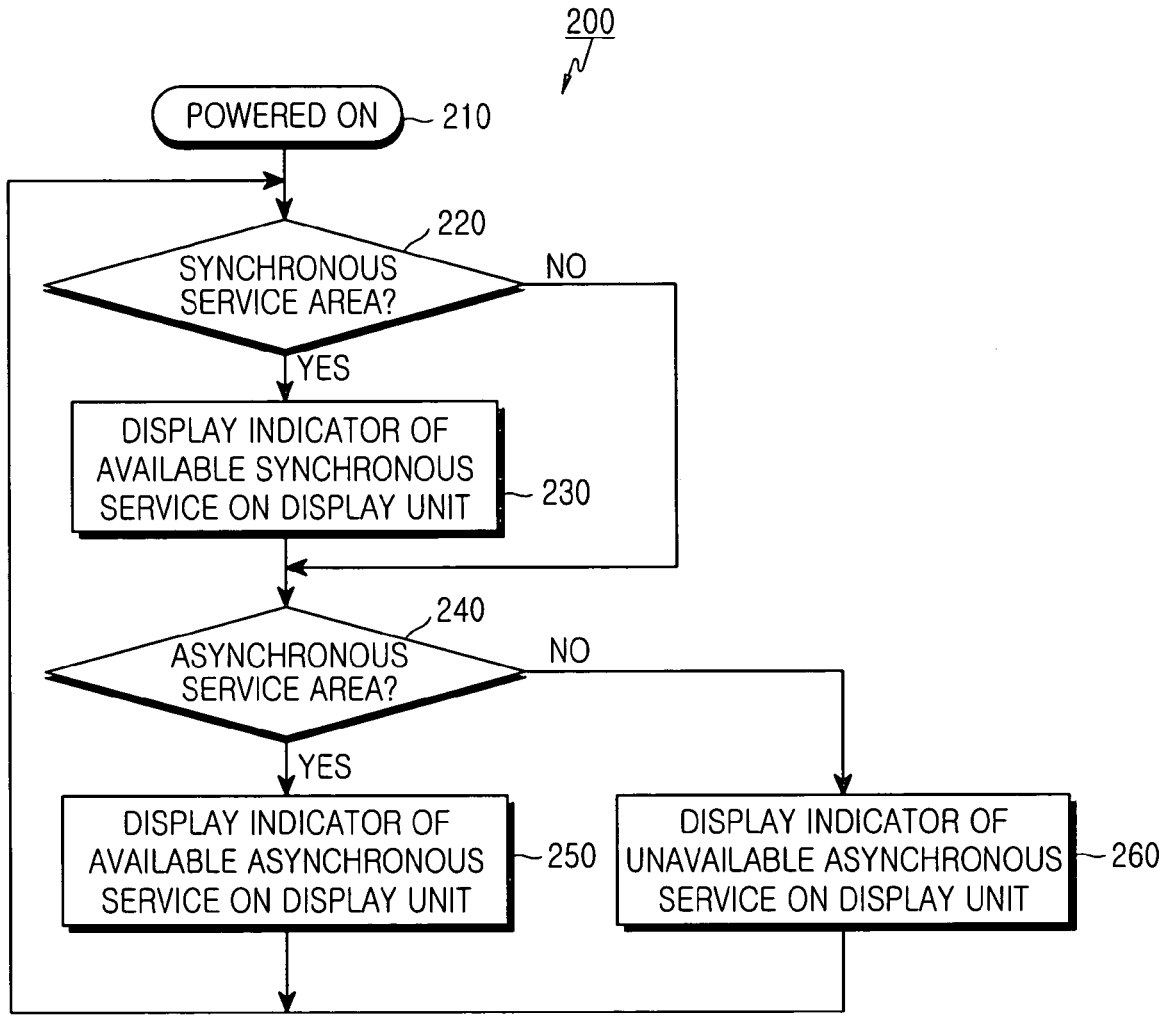
FIG. 3 is a control flow diagram illustrating a method of informing a user as to which mobile communication system a terminal is currently connected to, according to an embodiment of the present invention.
Figure 4A:
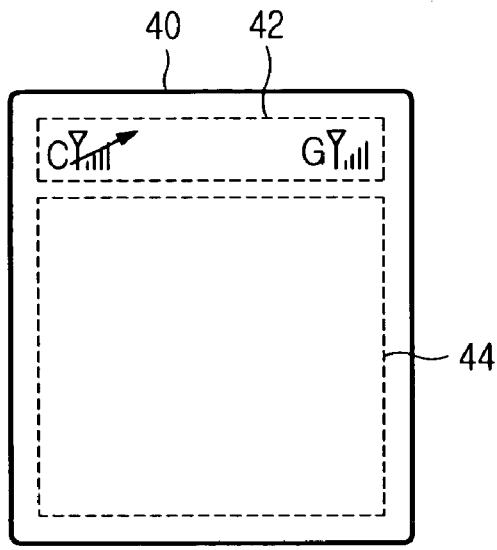
FIGS. 4A and 4B are example of screenshots on a display unit for which an indicator of a mobile communication system providing a communication service is displayed in the dual-mode mobile terminal according to the present invention.
Figure 4B:
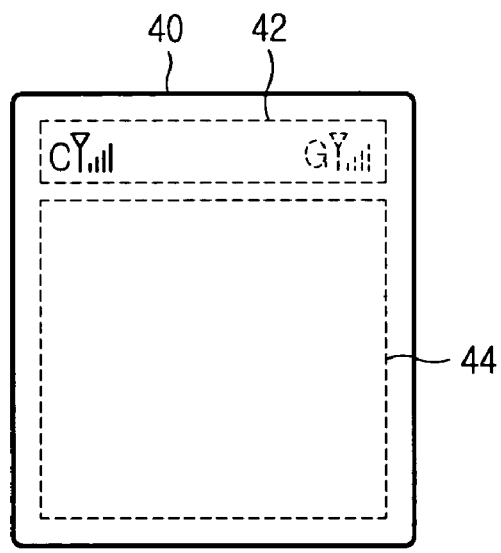

FIG. 3 is a control flow diagram illustrating a procedure for informing the user of which mobile communication system the dual-mode terminal is currently connected to, according to an embodiment of the present invention. FIGS. 4A and 4B are example screenshots of the display unit on which the indicator of a mobile communication system providing a communication service is displayed in the dual-mode terminal according to the present invention.

As illustrated in FIG. 3, if the dual-mode terminal is turned on at step 210, the controller 30 determines, at step 220, if the dual-mode terminal is currently located in an area where a CDMA synchronous communication service is available. When the dual-mode terminal is turned on, the terminal is synchronized with a base station of a mobile communication system, which can be accessed by the terminal, in order to receive a mobile communication service therefrom. Accordingly, the dual-mode terminal can determine which mobile communication system currently provides the communication service to the terminal.

If it is determined at step 220 that the dual-mode terminal is not located in the area where the synchronous communication service is available, the controller 30 moves to step 240.

If it is determined that the dual-mode terminal is located in the area where the synchronous communication service is available, the controller 30 moves to step 230 to display an indicator that the synchronous communication service is available on the display unit, and then proceeds to step 240.

At step 240, the controller 30 determines if the dual-mode terminal is currently located in an area where a GSM asynchronous communication service is available. If it is determined at step 240 that the dual-mode terminal is located in the area where the asynchronous communication service is available, the controller 30 proceeds to step 250 to display an indicator that the asynchronous communication service is available on the display unit. If the dual-mode terminal can currently access one of the synchronous and asynchronous mobile communication systems, the controller 30 can display only an indicator of the one mobile communication system that can currently provide the communication service.

In an alternate embodiment, the controller 30 displays both an indicator of one mobile communication system, from which the terminal 100 can currently receive a communication service, and an indicator of another mobile communication system, from which the terminal 100 cannot currently receive a communication service, in different manners. More specifically, as illustrated in FIG. 4B, the controller 30 displays an indicator of one of the synchronous and asynchronous mobile communication systems, from which the terminal 100 can currently receive a communication service, in the form of a solid line, and displays an indicator of the other system, from which the terminal 100 cannot currently receive a communication service, in the form of a dotted line. Alternatively, in FIG. 4A, the controller 30 displays an indicator of the other mobile communication system, from which the terminal 100 cannot currently receive a communication service, in conjunction with another indicator that the communication service is unavailable. In addition to the indicator of a mobile communication system that currently provides a communication service to the dual-mode terminal, the controller 30 may display a received signal strength indicator that indicates the strength of a signal received from the mobile communication system.

As is apparent from the above description, the present invention provides a dual-mode terminal that informs the user as to which mobile communication system currently provides a communication service to the terminal, whereby the user can easily receive a communication service through a desired mobile communication system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

For example, although the embodiments of the present invention have been described above with reference to the dual-mode terminal that can access two mobile communication systems at the same time, those skilled in the art will appreciate that the present invention can also be applied to a dual-mode terminal that can access two mobile communication systems but can access only one mobile communication system at once. If the dual-mode terminal can access two mobile communication systems, the terminal may constantly light an indicator of one of the two mobile communication systems to which the terminal is currently connected to receive a communication service while blinking an indicator of the other system to which the terminal can connect but is not currently connected, and vice versa. This enables the user to identify a mobile communication system that provides a current communication service and mobile communication systems that the terminal can access to receive communication services.

Accordingly, the scope of the present invention should not be limited to the above embodiments, but defined by the accompanying claims as well as any equivalents thereof.

What is claimed is:

1. A dual-mode mobile terminal comprising a controller for simultaneously accessing at least two mobile communication systems, detecting when the terminal is currently located in service areas of the at least two mobile communication systems, and simultaneously displaying indicators of the at least two mobile communication systems, which currently provide a communication service to the terminal.

2. The terminal according to claim 1, wherein the controller displays the indicator of one of the at least two mobile communication systems, from which the terminal currently receives the communication service, in solid lines, and displays the indicator of the other of the at least two mobile communication systems, from which the terminal cannot currently receive a communication service, in dotted lines.

3. The terminal according to claim 1, wherein the controller displays the indicator of one of the at least two mobile communication systems, from which the terminal cannot currently receive a communication service, in conjunction with another indicator.

4. The terminal according to claim 1, wherein the controller displays a received signal strength indicator that indicates a strength of a signal received from the at least one mobile communication system providing the communication service to the terminal.

5. A dual-mode mobile terminal, the terminal comprising a controller for simultaneously accessing a synchronous mobile communication system and an asynchronous mobile communication system, detecting when the terminal is currently located in an area where a synchronous communication service is available and in an area where an asynchronous communication service is available, and simultaneously displaying separate indicators for the synchronous and asynchronous communication systems that currently provide a communication service to the terminal.

6. The terminal according to claim 5, wherein the synchronous mobile communication service is a code division multiple access (CDMA) mobile communication system.

7. The terminal according to claim 5, wherein the asynchronous mobile communication service is a global system for mobile communications (GSM) mobile communication system.

8. A method for controlling a dual-mode mobile terminal, the method comprising the steps of:
   simultaneously accessing at least two mobile communication systems;
   determining if the terminal is currently located in service areas of the at least two mobile communication systems; and
   simultaneously displaying indicators for the two mobile communication systems that currently provide a communication service to the terminal.

9. The method according to claim 8, further comprising the step of:
   displaying an indicator of one of the at least two mobile communication systems, from which the terminal cannot currently receive the communication service, as a dotted line.

10. The method according to claim 8, further comprising the step of:
    displaying an indicator of one of the at least two mobile communication systems, from which the terminal cannot currently receive the communication service, in conjunction with another indicator that the communication service is unavailable.

11. The method according to claim 8, further comprising the step of:
    displaying a received signal strength indicator of a strength of a signal received from the at least one mobile communication system providing the communication service to the terminal.

* * * * *